Figure 1:
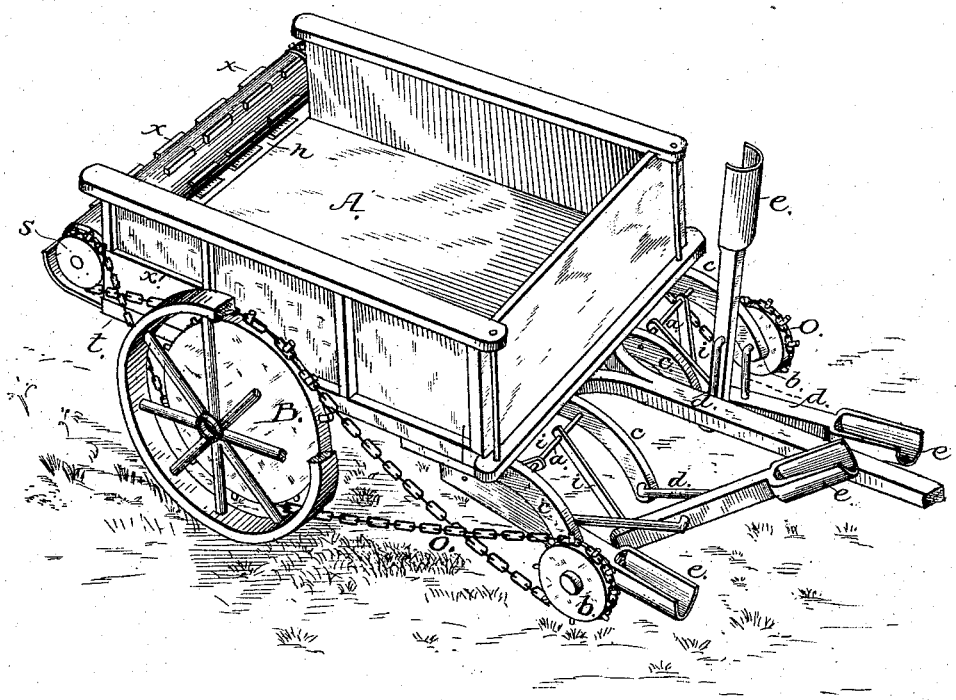

(No Model.) 2 Sheets—Sheet 1.

J. L. HUBBARD.
Self Loading Cart.

No. 241,365. Patented May 10, 1881.

Attest:
T. Walter Fowler
J. D. Garfield

Inventor:
John L. Hubbard
By Henry A. Chapin
Atty.

N. PETERS, Photo-Lithographer, Washington, D. C.

(No Model.) 2 Sheets—Sheet 2.
J. L. HUBBARD.
Self Loading Cart.
No. 241,365. Patented May 10, 1881.
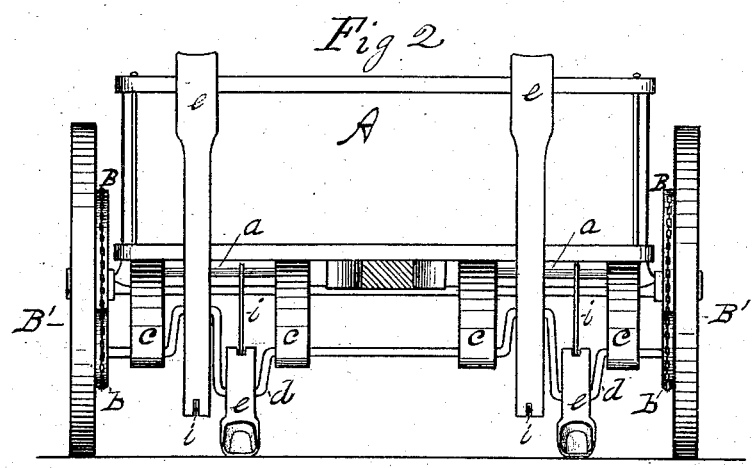
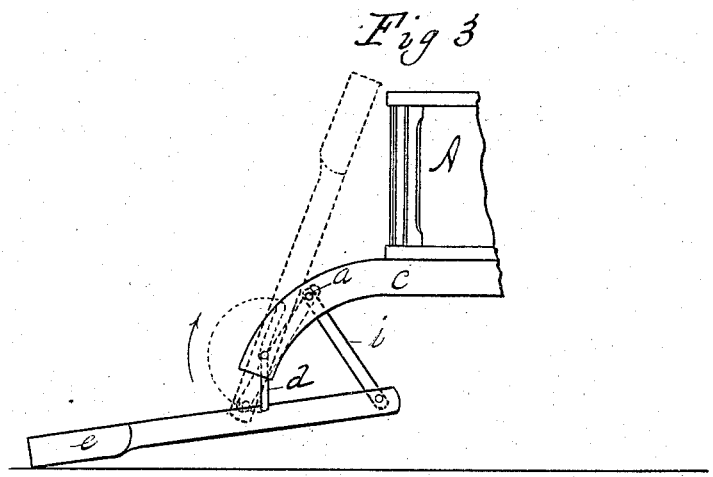

UNITED STATES PATENT OFFICE.

JOHN L. HUBBARD, OF AGAWAM, MASSACHUSETTS.

SELF-LOADING CART.

SPECIFICATION forming part of Letters Patent No. 241,365, dated May 10, 1881.

Application filed September 13, 1880. (No model.)

*To all whom it may concern:*

Be it known that I, JOHN L. HUBBARD, a citizen of the United States, residing at Agawam, county of Hampden, and State of Massachusetts, have invented a new and useful Self Loading and Discharging Cart, of which the following is a specification.

This invention consists in novel mechanism to be attached to a cart to operate by the movement of the latter to automatically load it with earth as it is drawn along, and of mechanism for automatically removing said earth from the cart and spreading it; and the construction and arrangement of said mechanisms will be fully hereinafter described in detail.

This invention is illustrated in the accompanying drawings, in which Figure 1 is a view of a cart to which my improvements are applied. Fig. 2 is a view of the front end of the same; and Fig. 3 is a side elevation of the front end of the cart, showing the driving-pulley removed from the crank shaft.

A is the cart-body. B is a chain-pulley secured against the inner face of the wheel B'. $c\ c\ c\ c$ are crank-supports secured under the forward end of the body B. $d\ d$ are cranks. $e\ e\ e\ e$ are shovels hung on cranks $d$. $a\ a$ are rods passing through supports $c$. $b$ is a pulley on the end of the shaft-forming crank $d$. $i\ i\ i\ i$ are connecting-rods between the rear ends of shovels $e$ and rods $a\ a$. $o$ is a driving-chain. $n$ is a distributing-roller. $s$ is a pulley on roller $n$. $t$ is a driving-chain carrying roller $n$. $x$ are sand-carriers projecting from roller $n$, and $x'$ is a support to one end of said roller.

My invention provides for the operation of automatically - acting shoveling devices for causing earth to be taken up and deposited in a cart as the latter is propelled along. The said devices consist of a series of shovels, $e$, which are hung upon one or two crank-shafts, $d$, which extend along just below the front end of the cart-body A, as shown. Said crank shaft or shafts are supported in the arms or supports $c$, which are secured to the cart-body. The rear ends of the shovels are pivotally hung to a rod or rods, $a$, which pass through supports $c$, by the connecting-rods $i$. A pulley, $b$, is fixed on the crank-shaft $d$, and a pulley, B, is secured to the inner face of the cart-wheel B', and a chain, $o$, transmits the rotary motion of wheel B' to the crank-shaft when the cart is propelled.

In the drawings is shown a short crank-shaft each side of the center of the cart-body, and when thus constructed each side of the cart is provided with the propelling devices shown; but if desired the tongue of the cart may be bent downward from the axle, so as to lie under the crank-shaft, and the latter be made in one piece, and be rotated by pulleys and chain on one side of the cart. Or if more shovel-propelling power be required, chains and pulleys may be applied to operate upon each end of a continuous crank-shaft.

As it is oftentimes convenient to be able to convey earth from the place from whence it is taken to a field and there evenly distribute it upon the ground, I apply, in such cases, a distributing-roller, $n$, to the rear end of the body A. This roller is hung in supports $x$, and its shaft is provided with a driving-pulley, $s$, upon which a chain, $t$, runs, passing from thence around a pulley on wheel B', and thus is rotated. Over the surface of roller $n$ is set a series of sand-carriers, $x$, which take up sand from within the body A, and, carrying it over, drop it in the rear of the cart as it passes along. This roller $n$ may or may not be used in conjunction with the said shoveling devices.

The operation of the hereinbefore-described devices in shoveling earth into the cart-body A is as follows, viz: It will be understood that the revolution of the wheels of the cart, of which B' is one, causes the crank-shaft and cranks $d$, through the connection of chain $o$, to revolve. This motion of the cranks causes the shovels $e$ to have a vertical and longitudinal reciprocating motion, and by attaching their rear ends to rod or rods $a$, by means of the connecting-rods $i$, all being pivoted one to the other, said pivoted rear ends of the shovels swing back and forth under the cart, while the cranks carry the shovels proper down forward into the earth and then quickly up and backward toward the end of the cart-body, throwing the earth into the latter. When the cart is thus loaded the chain $o$ may be disconnected from pulley $b$ on the crank-shaft, or a suitable clutch may be used, whereby said pulley may be so disconnected from the shaft, so as to allow it to revolve freely thereon. Thus the cart may be driven off to the place of discharge without operating the shovels.

The operation of the distributing-roller $n$ will be fully understood from the description already given.

What I claim as my invention is—

1. The combination, with the cart-body A, and with suitable crank-shaft-propelling devices operating by the revolution of the cart-wheels, of the crank-shaft provided with cranks $d$, the shovels $e$, and the connecting-rods $i$, substantially as and for the purpose set forth.

2. The combination, with the body A, of the cranks $d$, suspended thereon, the shovels $e$, connecting-rods $i$, and mechanism for rotating said cranks, substantially as set forth.

JOHN L. HUBBARD.

Witnesses:
 WM. H. CHAPIN,
 F. L. SAFFORD.